No. 827,634. PATENTED JULY 31, 1906.
P. HOLMBERG.
BUTTER CUTTER.
APPLICATION FILED MAR. 5, 1906.
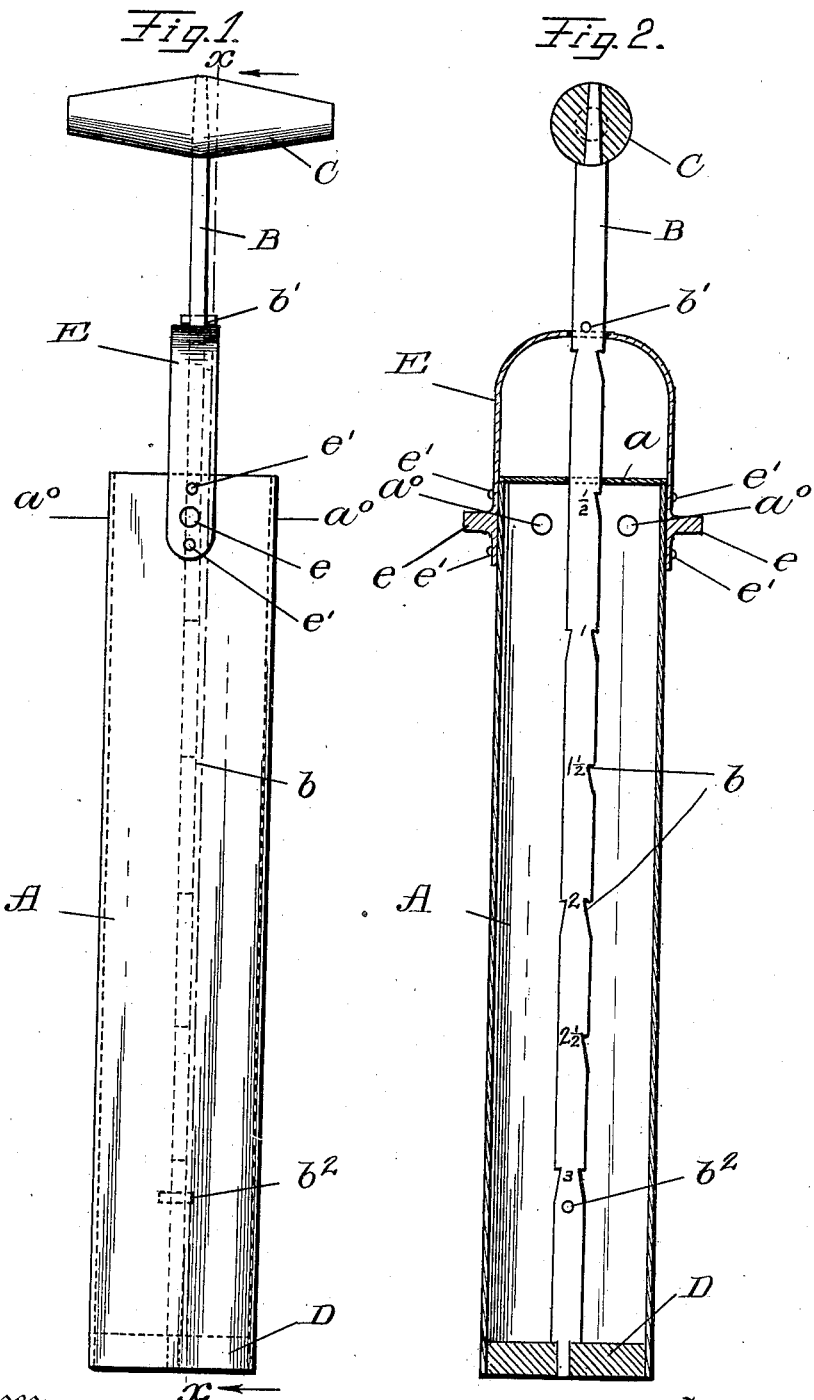

UNITED STATES PATENT OFFICE.

PER HOLMBERG, OF NEW ORLEANS, LOUISIANA, ASSIGNOR OF ONE-HALF TO MORRIS LEVY, OF NEW ORLEANS, LOUISIANA.

BUTTER-CUTTER.

No. 827,634.     Specification of Letters Patent.     Patented July 31, 1906.

Application filed March 5, 1906. Serial No. 304,316.

*To all whom it may concern:*

Be it known that I, PER HOLMBERG, a citizen of the Kingdom of Sweden, residing at New Orleans, in the parish of Orleans and State of Louisiana, have invented certain new and useful Improvements in Butter-Cutters; and I do hereby declare the following to be a full, clear, and exact description of the invention, such as will enable others skilled in the art to which it appertains to make and use the same.

This invention relates to improvements in devices for cutting butter, lard, tallow, or similar compounds, but for the purpose of brevity will be referred to simply as for use with butter.

The object of the invention is to provide means for extracting butter from containing firkins or similar receptacles and dispensing portions of same in suitable shapes and in predetermined quantities.

Referring to the drawings illustrating a practical embodiment of the invention, Figure 1 is a view in side elevation of the device, and Fig. 2 a longitudinal section on the line $x\,x$ of Fig. 1.

A is the casing, provided with the apertured top plate $a$. This casing may be of any suitable shape, dependent upon the desired configuration of the blocks of butter to be dispensed; but in the drawings and for the purpose of illustration the casing or shaping and containing chamber is illustrated as being square in cross-section.

B is the plunger-rod, provided with a plurality of notches $b$ on its edge faces for a purpose hereinafter referred to and also provided with the transverse pins or stops $b'\ b^2$ at suitable distances from the respective ends of the plunger-rod.

C designates a handle for the plunger-rod, and D the plunger carried at the opposite end of the rod and operating within the casing A, the upper end of the casing A being provided with one or more apertures $a^0$ to allow of the escape of air from within the cylinder as the plunger is withdrawn therein.

In addition to the plunger-rod being guided by the plunger D and the apertured plate $a$ there is also formed a brace or curved member E, secured at its ends, as by rivets $e'$, to the casing A and slotted to receive and guide the upper end of the flat plunger B, the pin $b'$ on the plunger being transversely disposed above said member E. Abutments are also formed on opposite sides of the casing at the upper end thereof and disposed in substantial alinement with the notched edges of the plunger-rod. In the drawings these abutments are designated at $e$ and are illustrated as comprising an integral portion of the member E.

The notches $b$ are so disposed with relation to each other as to regulate the ejection or dispensing of the entire contents of the casing in predetermined quantities or portions of the whole. For instance, in the drawings the notches on the right-hand side indicate half-pound quantities and the notches on the left-hand side above the first notch indicate pound quantities. There may also be disposed on the flat faces of the plunger-rod characters indicating the quantity of butter remaining within the casing, as shown in the drawings by the designations "$\frac{1}{2}$" to "3."

In operation the plunger is drawn within the casing until the pin $b^2$, engaging the member E, will limit the plunger's inward movement. In this position the plunger will be at the top of the casing. If it is desired to eject a half-pound of the butter, the casing may be laid on its right-hand side, with the abutment $e$ in engagement with a counter or block, so that notches $b$, representing half-pound quantities, will be disposed downwardly. Upon forcing the plunger outwardly there is more or less of a downward pressure on the handle C, and when the notch opposite the numeral "3" reaches the top $a$ of the casing the outward movement of the plunger will be checked and the butter projecting from the end of the casing will represent one-half pound and may be sliced off with a suitable knife. This operation may continue until all of the contents are ejected. In delivering pound quantities the opposite side of the casing is laid on the counter and the plunger similarly operated. By "outward thrust or movement" is meant the direction of movement of the plunger when being forced toward the discharge end of the casing, as contradistinguished from the reverse movement when the plunger is being withdrawn in the casing to allow the latter to be filled up.

Having thus described the invention, what I claim is—

1. The combination with a casing, of a plunger and plunger-rod operating therein, said plunger-rod being provided with a plurality of series of notches, the notches of said respective series being disposed at different distances apart and said notches coöperating with said casing to limit the outward movement of said plunger for ejecting in varied predetermined quantities the contents of said casing, substantially as described.

2. The combination with a casing, of a plunger and plunger-rod operating therein, said plunger-rod being provided with a plurality of notches arranged at predetermined distances therealong, and abutments carried on the outside of said casing in substantial alinement with the path of travel of said notches, substantially as described.

3. The combination with a casing provided with a slotted top and lateral apertures below said top, of a brace member secured at its ends to the side of said casing and extending above said top, said brace member being provided with a slot alining with the slot in said top and provided with abutments extending laterally of said casing, a plunger operating in said casing, a plunger-rod connected at one end to said plunger and extending through said slots, said rod being provided with a plurality of notches coöperating with said casing to limit the outward movement of said plunger, and pins or stops carried by said plunger-rod on opposite sides of said brace member, substantially as described.

In testimony whereof I affix my signature in presence of two witnesses.

PER HOLMBERG.

Witnesses:
KARL GUHARDT,
R. A. LELOUGH.